United States Patent
Li

(10) Patent No.: US 9,558,021 B2
(45) Date of Patent: Jan. 31, 2017

(54) SYSTEM AND METHOD FOR CROSS-PLATFORM APPLICATION EXECUTION AND DISPLAY

(75) Inventor: James Li, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 650 days.

(21) Appl. No.: 13/618,554

(22) Filed: Sep. 14, 2012

(65) Prior Publication Data

US 2013/0074069 A1  Mar. 21, 2013

Related U.S. Application Data

(60) Provisional application No. 61/535,464, filed on Sep. 16, 2011.

(51) Int. Cl.
G06F 9/455 (2006.01)
G06F 9/445 (2006.01)

(52) U.S. Cl.
CPC ........... *G06F 9/45533* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 6,052,781 A * | 4/2000 | Weber | 726/22 |
| 6,397,242 B1 * | 5/2002 | Devine et al. | 718/1 |
| 6,453,469 B1 * | 9/2002 | Jystad | 717/174 |
| 6,496,847 B1 * | 12/2002 | Bugnion et al. | 718/1 |
| 6,763,518 B2 * | 7/2004 | Hart et al. | 718/1 |
| 6,789,156 B1 * | 9/2004 | Waldspurger | 711/6 |
| 7,788,593 B1 * | 8/2010 | Grechishkin et al. | 715/778 |
| 7,895,594 B2 * | 2/2011 | Kirilline et al. | 718/1 |
| 7,987,432 B1 * | 7/2011 | Grechishkin et al. | 715/778 |
| 8,091,084 B1 * | 1/2012 | Dobrovolskiy et al. | 717/174 |
| 8,141,066 B2 * | 3/2012 | Chatterjee et al. | 717/158 |
| 8,365,164 B1 * | 1/2013 | Morgenstern | 717/175 |
| 8,732,607 B1 * | 5/2014 | Grechishkin et al. | 715/781 |
| 2003/0093659 A1 * | 5/2003 | Wen et al. | 713/1 |
| 2006/0010433 A1 * | 1/2006 | Neil | 717/138 |
| 2007/0260831 A1 * | 11/2007 | Michael et al. | 711/162 |

(Continued)

FOREIGN PATENT DOCUMENTS

| | | |
|---|---|---|
| EP | 2021939 A1 | 2/2009 |
| EP | 2056199 A2 | 5/2009 |
| WO | 2007130209 A1 | 11/2007 |

*Primary Examiner* — Emerson Puente
*Assistant Examiner* — Mehran Kamran
(74) *Attorney, Agent, or Firm* — David D. Brush; Westman Champlin & Koehler, P.A.

(57) ABSTRACT

A method is provided for downloading and running a non-native application designed for a source operating system (OS) on a target device having a target OS, the method includes: connecting the target device to a source device having the application in a paring operation; transferring a shareable provisional profile containing characteristics related to the application, including information on the source OS needed to run the application from the source device to the target device; and obtaining the source OS on the target device. Once the source OS is present on the target device, the method downloads the application from the source device to the target device, executes the source OS as a virtual machine on the target device, and runs the application within the source OS virtual machine.

8 Claims, 7 Drawing Sheets

(56) References Cited

U.S. PATENT DOCUMENTS

| | | | |
|---|---|---|---|
| 2008/0130639 A1* | 6/2008 | Costa-Requena et al. | ... 370/389 |
| 2011/0276961 A1* | 11/2011 | Johansson et al. | ........... 717/178 |
| 2012/0311560 A1* | 12/2012 | Dobrovolskiy et al. | ...... 717/174 |
| 2013/0055255 A1* | 2/2013 | Wagner et al. | ................... 718/1 |
| 2013/0167242 A1* | 6/2013 | Paliwal | ........................... 726/26 |
| 2013/0290858 A1* | 10/2013 | Beveridge | .................... 715/740 |
| 2014/0059547 A1* | 2/2014 | Wang et al. | ...................... 718/1 |

* cited by examiner

| 170 | TARGET PLATFORM CONTROL MGR. (SMART VMM) |
| --- | --- |
| Capability | Installed |
| iOS | iOS |
| Android | Android |
| BlackBerry OS | BlackBerry OS |

FIG. 6A

| APPLICATION / Platform | BlackBerry OS | iOS | Android | Windows Mobile | Palm OS |
| --- | --- | --- | --- | --- | --- |
| Solitaire | Y | Y | N | Y | N |
| GPS and Map | Y | Y | Y | N | Y |
| Microsoft Word | Y | Y | Y | N | N |
| Chat | Y | N | N | Y | Y |
| World Clock | Y | Y | Y | Y | Y |

APPLICATION-PLATFORM
COMPATIBILITY MATRIX

FIG. 6B

| Platform-PCM / Supported Platform | BlackBerry OS | iOS | Android | Windows Mobile | Palm OS |
| --- | --- | --- | --- | --- | --- |
| BlackBerry-PCM | Y | Y | N | Y | N |
| iOS-PCM | Y | Y | Y | N | Y |
| Android-PCM | Y | Y | Y | N | N |
| Windows Mobile-PCM | Y | N | N | Y | Y |
| Palm OS-PCM | Y | Y | Y | Y | Y |

PLATFORM-PCM COMPATIBILITY
MATRIX

FIG. 6C

SYSTEM AND METHOD FOR CROSS-PLATFORM APPLICATION EXECUTION AND DISPLAY

CROSS-REFERENCE TO RELATED APPLICATION

The present application is based on and claims the benefit of U.S. provisional patent application Ser. No. 61/535,464, filed Sep. 16, 2011, the content of which is hereby incorporated by reference in its entirety.

BACKGROUND

A computing platform generally includes some form of hardware architecture and a software framework (including application frameworks). This combination allows the software to run on the hardware. Typical platforms include a computers hardware and low-level software architecture, its operating system (OS), and related user interfaces (run-time system libraries or graphical user interface). Software is developed for these platforms in a software development environment using programming languages that can make use of extensive libraries and development tools, such as debuggers, etc.

Various known platforms include hardware architecture, such as the Intel x86 processors, Advanced RISC Machine (ARM) architecture, etc. They also make use of different operating systems, such as Windows, Linux, Mac OS, Chrome OS, Meego OS, Android, iOS, Web OS, Palm OS, Windows Mobile, BlackBerry, Embedded Linux, etc. The computing platform is not limited to a particular software framework.

The operating system typically provides an interface between applications and the underlying hardware of the computing device, and provides security, control, access, and sharing of the hardware, including input/output elements and a user interface. However, applications are generally designed to run within the context of a particular operating system, and a user chooses an application to purchase that is specific to the operating system running on the user's device.

In some instances, it is desirable to run an application designed for one operating system on a processor/device using another operating system, and even to run applications designed for different operating systems on a common device simultaneously. This might be the case when, for example, an application exists that has been developed for a first OS and not a second OS. A user having a device running the second OS may wish to run the application on his device with the second OS.

To address this issue, virtualization technology has been developed. Virtualization technology allows one or more virtual machines (VM(s)) (a "machine" which is completely implemented in software) to run concurrently on a single physical hardware element. The software or firmware that creates a virtual machine on the host hardware is called a hypervisor (also known as a Virtual Machine Manager (VMM)). There are different types of virtualizations: full, partial, and para.

The hypervisor provides a software virtualization environment in which other software, including operating systems, can run with the appearance of full access to the underlying system hardware, but where, in fact, such access is under the complete control of the hypervisor. The software running in such a hypervisor managed environment is said to be executing within a VM. Multiple VMs may be managed simultaneously by the hypervisor. Hypervisors are generally classified as Type 1 or Type 2 (FIG. 7), depending on whether the hypervisor is running in supervisor mode or privileged mode directly on top of the hardware itself (Type 1) or is itself hosted by a native operating system of the device (Type 2).

An embedded hypervisor is a Type 1 hypervisor that supports the requirements of embedded systems development and is designed into the embedded device from the outset, rather than loaded subsequent to device deployment. The requirements for a hypervisor architecture suitable for embedded applications is quite distinct from hypervisors aimed at enterprise applications, which have a fundamentally different set of requirements. The requirements for the embedded applications hypervisor architecture are summarized as follows:

A small, fast Type 1 hypervisor with support for multiple VMs;

Support for a relatively simple but secure encapsulation of a moderately complex subsystem components that interact strongly;

High-bandwidth, low-latency communication between system components, subject to a configurable, system-wide security policy;

Minimal impact on system resources & real-time performance; and

An ability to implement a scheduling policy between VMs and provide support for real-time system components.

A further development in the art is that multi-core devices are becoming more and more common. A multi-core device is a device that uses a single physical processor (designed on a single chip) that combines two or more complete execution cores. Advantageously, since each execution core has its own cache, many computational tasks can be performed in parallel. Currently, multi-core host architectures exist in servers, desktop PCs, and notebooks. However, new consumer devices such as mobile phones, tablets, and embedded devices such as set-top boxes and home gateways are also beginning to migrate to a multi-core architecture.

SUMMARY

Virtualization in embedded devices opens up new opportunities for companies building next-generation products using single or multi-core devices. A multi-OS environment in embedded virtualization on a multi-core architecture is the direction of future developments. In the design envisioned herein, consumers can access applications and data across platforms and devices, and the devices will allow one application to run and display from one platform to another, thereby giving users a unified experience and convenience. Thus, various embodiments of the present disclosure define the system design and methods for running application across platforms.

Although it is known to provide content sharing between different devices and OS platforms at the data level, there is no good solution for cross-platform application sharing. Thus, the embodiments discussed below provide methods for interactive device-to-device cross-platform application execution and display.

Each device can have its own form factor, computing platform, and list of applications and settings. Permitting one application available one device to run on another device is technologically challenging due to the different hardware form factor and different computing platform and available resources. Virtualization makes this possible, and this application-profile-driven cross-platform method makes this experience even more unified, interactive and interoperable. Thus, the method can be applied to any device that has the inventive platform control manager (e.g., smart hypervisor) available.

Accordingly, a method is provided for downloading and running a non-native application designed for a source operating system (OS) on a target device having a target OS, the method comprising: connecting the target device to a source device having the application in a paring operation; transferring a shareable provisional profile containing characteristics related to the application, including information on the source OS needed to run the application from the source device to the target device; obtaining the source OS on the target device by: a) preloading, prior to the connecting, the source OS on the target device; b) downloading the source OS from the source device via the pairing connection between the source device and the target device; or c) downloading the source OS from a network storage area over a network.

Once the source OS is present on the target device, the method comprises downloading the application from the source device to the target device; executing the source OS as a virtual machine on the target device; and running the application within the source OS virtual machine.

A target or electronic device is also provided, for downloading and running a non-native application designed for a source operating system (OS), the electronic device having a target OS, the electronic device being operable to connect to a source device having the application in a paring operation; transfer from the source device a provisional profile containing characteristics related to the application, including information on the source OS needed to run the application; obtain the source OS on the target device using on the provisional profile; once the source OS is present on the target device: download the application from the source device to the target device; execute the source OS as a virtual machine in the target OS on the target device; and run the application within the source OS virtual machine.

A non-transitory computer program product, comprising a computer usable medium having a computer readable program code embodied therein, said computer readable program instructions adapted to be executed to download and run a non-native application designed for a source operating system (OS) on a target device having a target OS.

DESCRIPTION OF THE DRAWINGS

The present disclosure is described below in terms of various embodiments illustrated in the following drawings.

FIG. 6A is a block diagram illustrating an exemplary target platform control manager;

FIG. 6B is an application-platform compatibility table illustrating the applications that can be run on various platforms;

FIG. 6C is a platform control manager-platform compatibility table illustrating the platforms that are supported by various platforms control managers.

DETAILED DESCRIPTION

The following describes various embodiments of the disclosure that incorporate a dynamic virtual machine (VM) allocation by a smart hypervisor to create a proper environment to run a non-native application.

Figure 1:
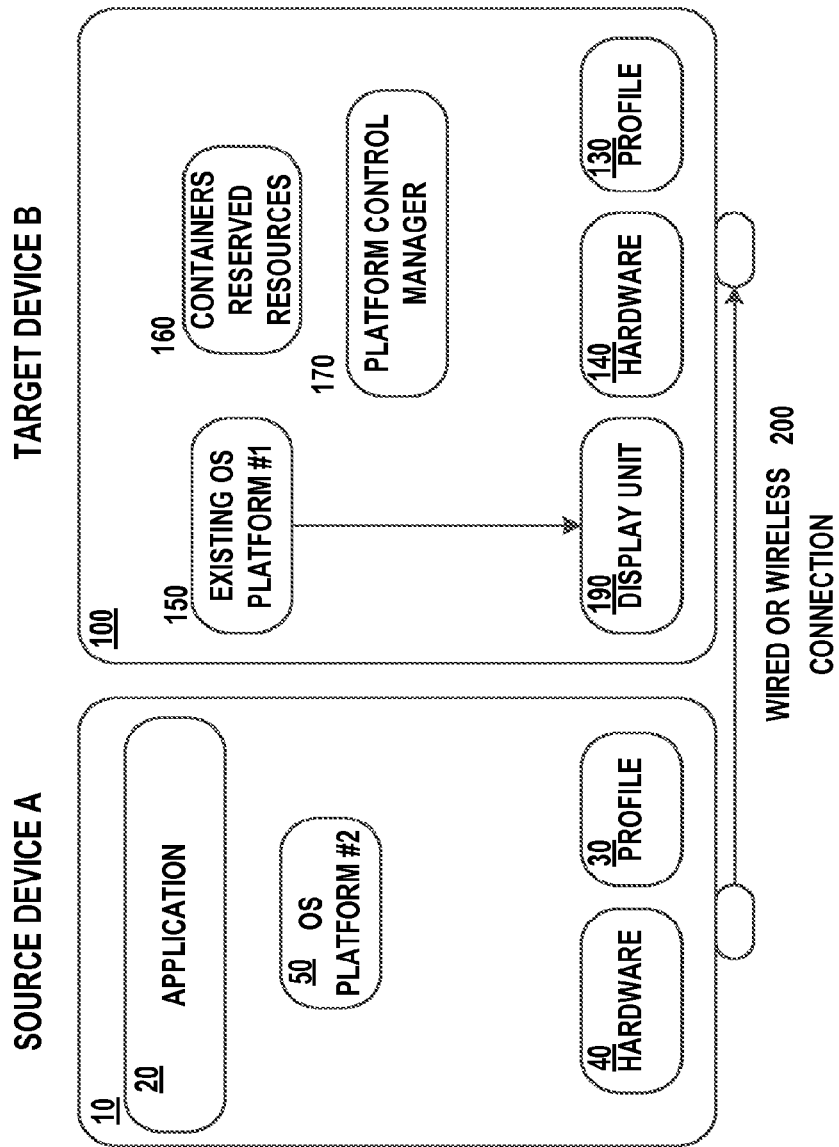
FIG. 1 is a block diagram illustrating the basic components of a source and target device according to a first embodiment.

FIG. 1 is a block diagram illustrating a source device 10 containing an application 20 that runs on a particular operating system (OS) platform 50. The OS platform 50 provides a way for the application 20 to interface with the device hardware 40. By way of example, the source device 10 is a Motorola Droid smartphone running, as the OS platform 50, the Android OS. The application 20 is a solitaire game.

A user of a target device 100 that is different from the source device, e.g., an iPhone, wishes to run the application 20 on the source device 10. However, its existing OS platform 150 is the iOS operating system, and no such solitaire application has been developed for it. The target device 100 also uses its OS 150 to interface with the device hardware 140. FIG. 1 shows the target device 100 having a display unit 190—the source device 10 could also have a similar display unit.

Figure 2:
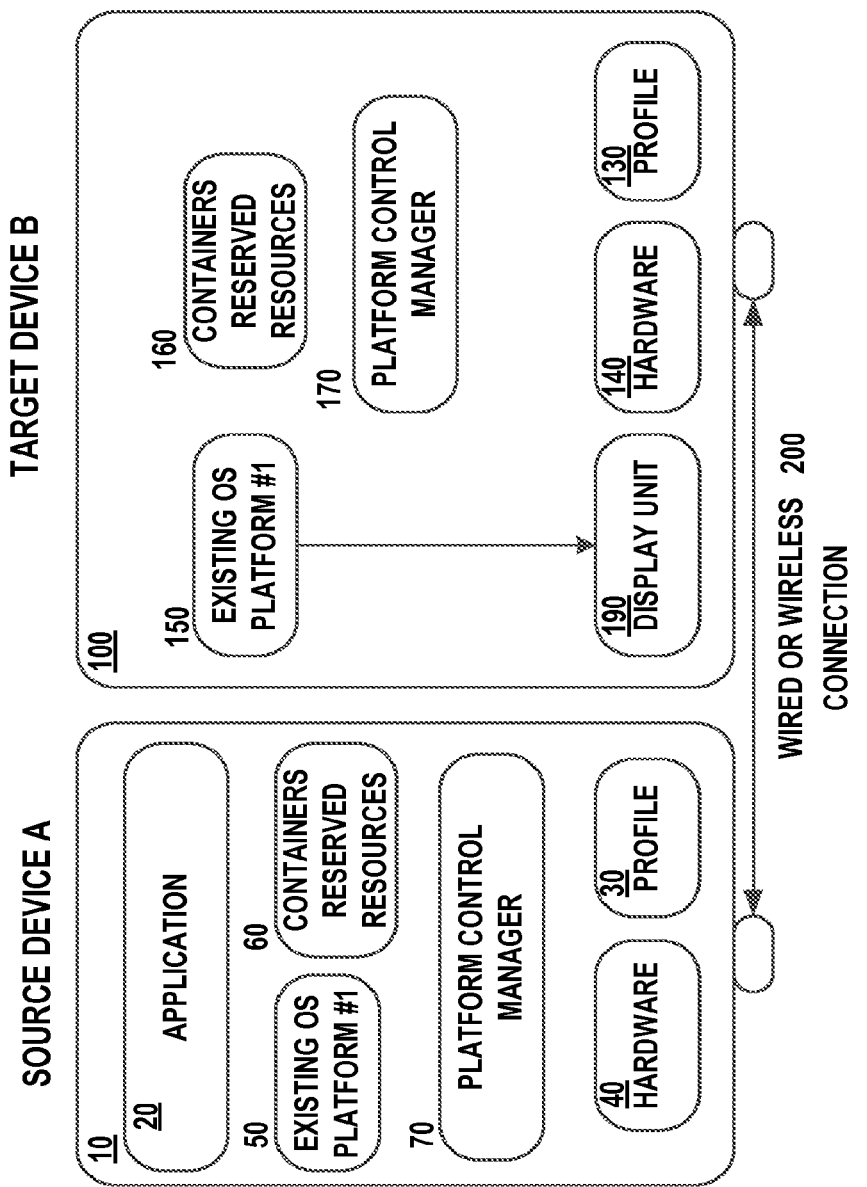
FIG. 2 is a block diagram illustrating the basic components of a source and target device according to a second embodiment.

The source device 10 has a shareable provisioning profile 30, provisioning profile in short, containing context information about its hardware 40, source OS 50, user applications 20, and other settings—the provisioning profile 30 contains all necessary information to permit another device to access its applications, and needed OS (even if the source device itself doesn't have a proper OS for the target device 100). In other words, it basically provides all necessary information for the needed application(s) (locally or externally located), and needed OS (locally or externally located). The source device 10 may (but does not have to contain) a platform control manager 70 (e.g., a smart hypervisor) (FIG. 2). In general, the platform control manager 70 is designed like an application or a service for negotiating between the source 10 and target 100 devices, handling device resource sharing, and determining the compatibility of the OS (and for obtaining the correct OS from a location other than the source device 10 if the source device does not have the proper OS). The hypervisor can run either on a single core or multicore. The platform control manager 70 can manage different cores on a multicore device and can allocate one or more cores for a particular OS.

The target device also has shareable provisioning profile 130, and has a platform control manager 170 (e.g., a smart hypervisor) as well. When the source device 10 is connected to the target device 100, either physically or via a pairing process, not only can the devices share resources such as application data, but also can share the computing platforms (OS or virtual machine) and hardware resources (such as storage, camera, touchpad, or other hardware needed to run an application) themselves via a negotiation process.

By way of example, using the above, the target device 100 iPhone running the iOS is able to load and execute, as a VM, the Android OS from the source device 10 Droid, and then load the solitaire game and run it on the VM. Thus, target device 100 receives the shared resources and provides the virtual environment for application execution and display on the target device's 100 display unit 190. This provides application-profile-driven cross-platform application execution and display.

The source device 10 provisioning profile 30 can be shared via a wired or wireless connection 200. This permits user applications 20 from the source device 10 to be executed on the target device 100 and appear via the user interface of the target device 100 containing an input (e.g., keyboard, touch screen, control buttons) and a display device 190.

The target device 100 has a platform control manager 170 to manage and allocate device resources for the OS platforms and containers 160 for running desired OS platforms. It also contains a provisioning profile 130 that has context about the device hardware 140, platform control manager 170, OS platforms 150, user applications, and settings that are accessible via the user interface 190. The target device 100 creates a virtual environment or creates an environment to host the VM and execute the application accordingly.

Referring to FIG. 2, The target device 100 can also serve as a source device 10, and the source device 10 can also serve as a target device 100, where the source device also has a platform control manager 70 that manages the containers 60 for running desired OS platforms.

Figure 3:
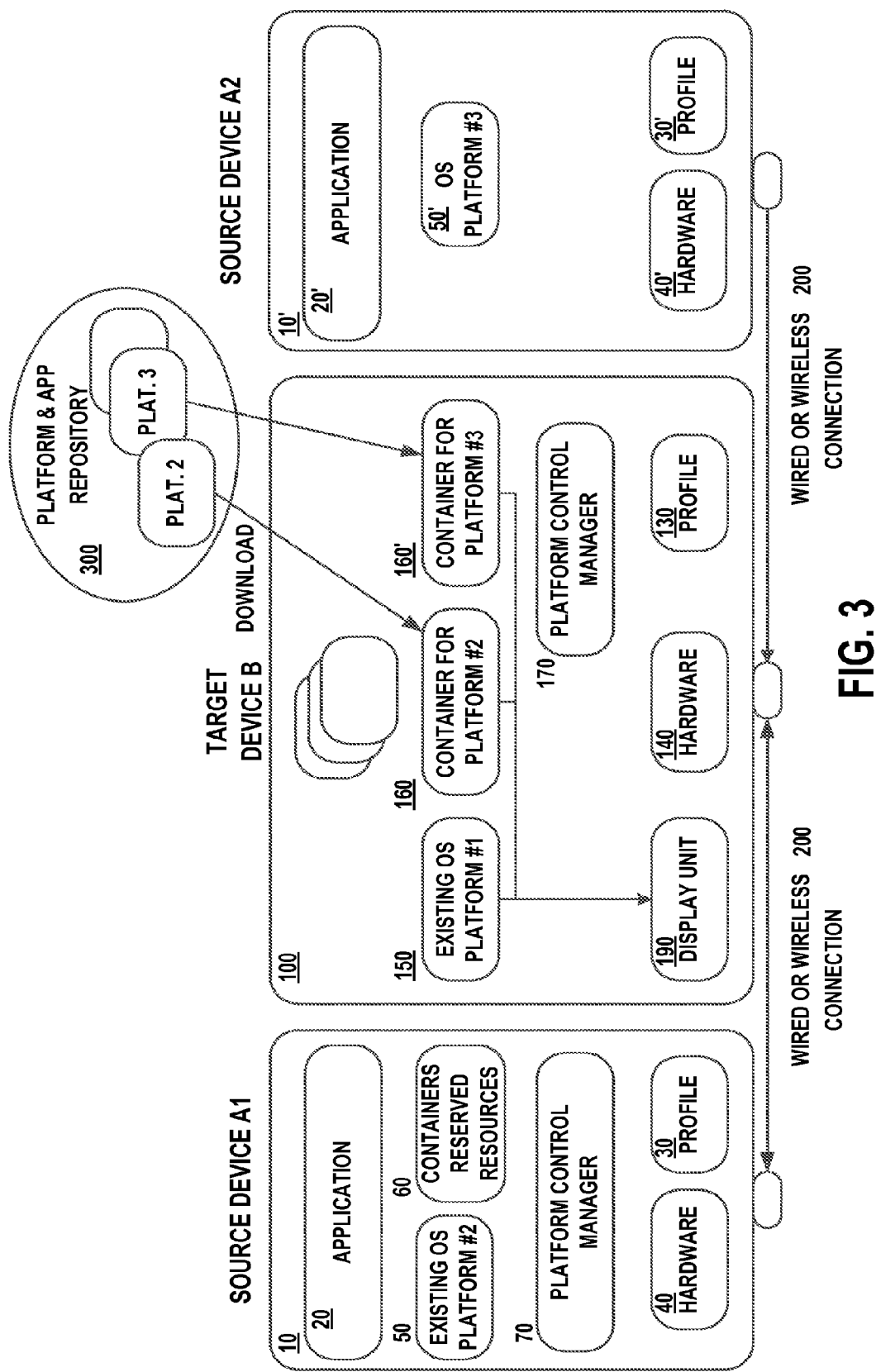
FIG. 3 is a block diagram illustrating the basic components of a source and target device according to a third embodiment.

FIG. 3 shows a more developed embodiment in which the target device 100 pairs with and acquires application and OS platforms from two separate source devices 10, 10' (A1, A2). The target device 100 in FIG. 3 has an additional container 160' for additional OS and application information from the second source device 10'. The number of applications and OSs that can be supported by the target device 100 is only limited by the amount of memory in and processing power of the target device 100.

As illustrated in FIG. 3, it is possible that the source device 10 does not have the ability to transfer its source OS to the target device 100 to run as a virtual machine. In that situation, a platform and application repository 300, which is a networked area, can provide the needed OS that can be downloaded to the target device 100 (this is also possible in the configurations/embodiments shown in FIGS. 1 and 2). The repository 300 can also provide applications as well.

Figure 4:
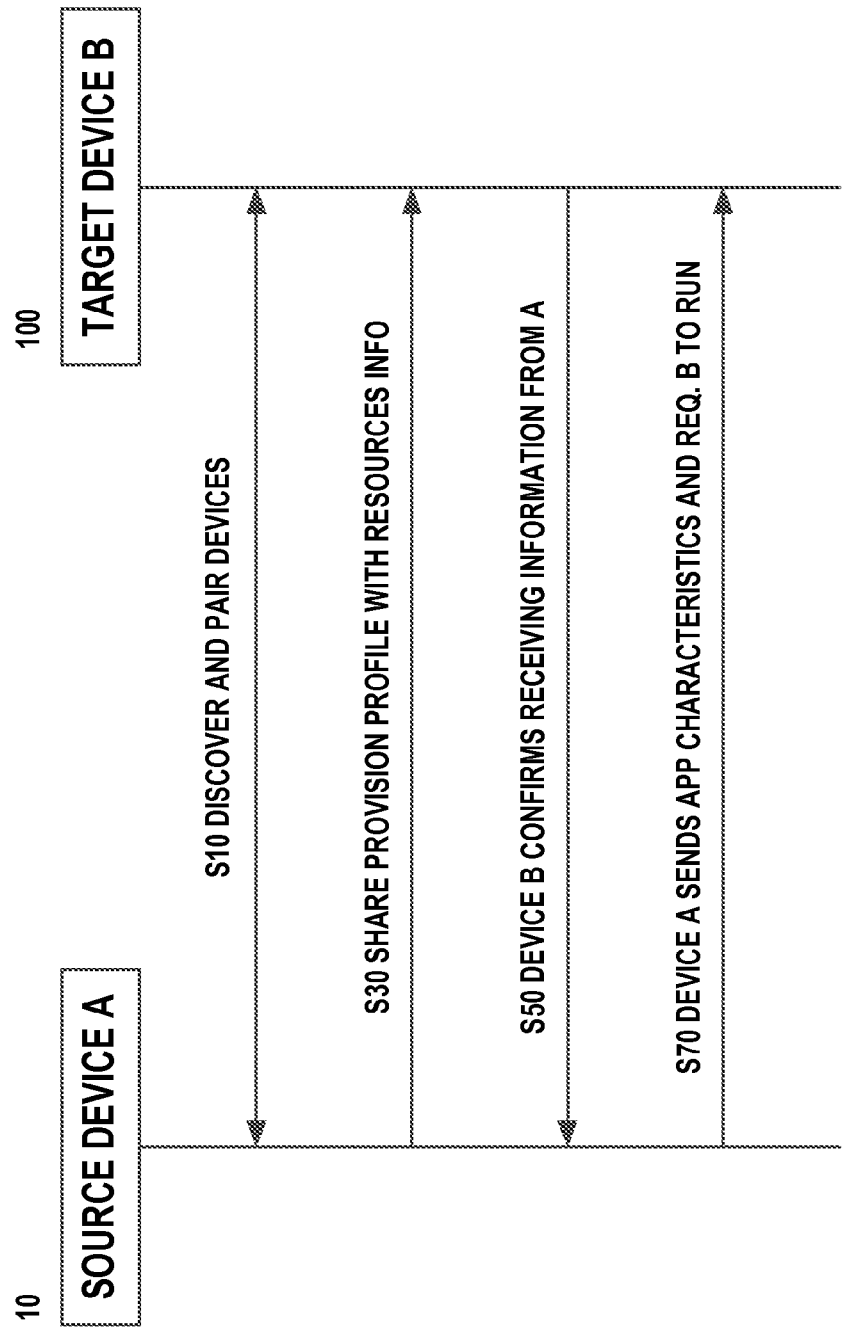
FIG. 4 is a transaction sequence diagram illustrating the basic sequence of actions between a source and target device.

A basic sequence of events between the two devices is detailed in FIG. 4. The initial step is for the devices 10, 100, to discover possible applications for sharing and then to pair with one another S10.

The discovery process could be initiated manually or automatically. The manual initiation could also be performed in various ways. Person B, having the target device B 100, could ask Person A, having the source device A 10, if a particular application, Application A, is available for transfer from his source device A. Instead of asking if a particular application is available, Person B could simply ask which, if any, applications are available from Person A's device 10. In an automated version, the target device 100 could periodically poll potential source devices 10 within its range, or could poll such devices 10 when detected within range, for a particular or all possible available applications.

Additionally, the platform control manager 70 of the source device 10 could broadcast available applications and OSs to surrounding devices, or the platform control manager 170 of the target device 100 could broadcast needed applications to surrounding devices. In effect, this permits a significant expansion over an application store in that the target device 100 is able to acquire resources on surrounding devices.

Once a determination is made that Person B would like to run an application 20 (Application A) from the source device 10, a further determination must be made as to whether the source device 10 can transfer its operating system platform 50 to the target device 100. The devices are linked together through a wired or wireless connection 200. For a wired connection 200, any standard communications protocol and cable, such as USB, could be used to interconnect the source device 10 with the target device 100. For a wireless connection 200, any standard wireless protocol, such as BluTooth® or Wi-Fi®, could be used. These connections work within a relatively small radius. However, the present disclosure does not limit connections to other devices to such small distances, and (particularly when a cloud or other server is used to download the OS) any form of wide-area network could be utilized to search for other applications and OSs and/or to pair two devices together.

Additionally, some type of pairing authorization must be provided to permit the target device 100 to access resources on the source device 10. Such an authorization could require an express entry of an acceptance to a specific pairing request by the source device 10 user. Alternately, the source device 10 could preauthorize requests for paring for access to all or certain applications.

Upon a successful pairing, in step S30, the source device 10 shares its provision profile 30 with the target device 100. This provision profile 30 contains information about what resources (such as applications, data, OS or execution platform, and hardware resources (such as a storage device over the wired or wireless connection) are available on the source device 10 to be shared. In step S50, the target device 100 confirms receiving this information. The source device 10 then transmits S70 the necessary requirements that it has available for the target device 100 to run the application. The necessary requirements include resources (application and data, if available, also OS or execution platform, or hardware resources), if needed by the target device 100, and available from the source device 10.

Figure 5:
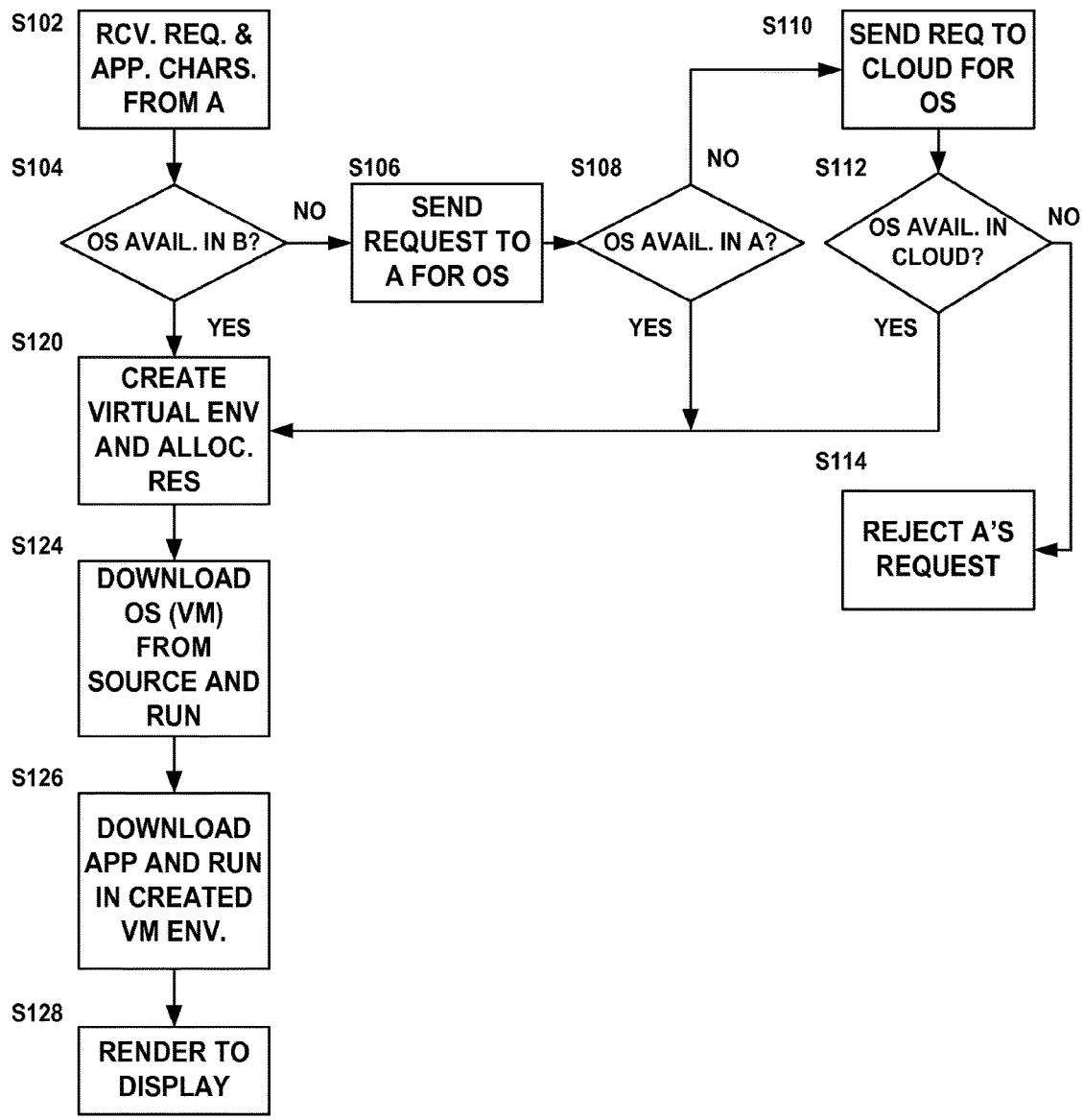
FIG. 5 is a flowchart illustrating an application transfer according to an embodiment of the disclosure.
Figure 7:
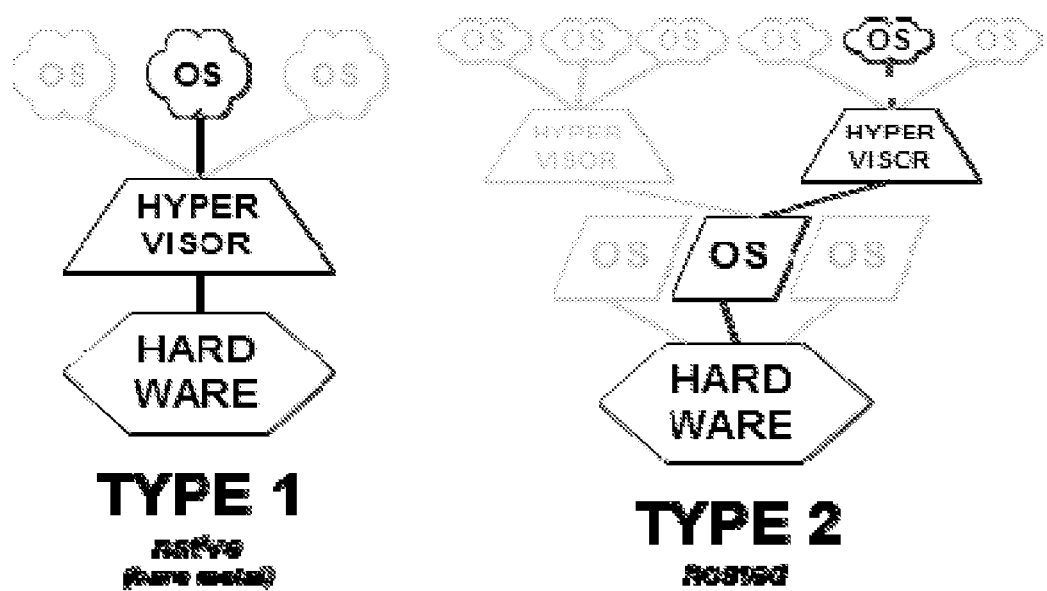
FIG. 7 is a block diagram illustrating known types of hypervisors.

Referring to FIG. 5, the target device's 100 platform control manager 170 (smart hypervisor) collects characteristics (i.e. the provisioning profile) about the desired application S102, including the needed OS environment for running it, and then goes through a negotiation process to determine information, such the resources needed, etc. Once needed resources are determined, the target device 100 will perform actions necessary to run the application on the target device 100. In the present system, the target device 100 obtains the correct OS for running the desired application using the provisioning profile. To do so, the target device operates as follows.

First, the target device checks S104 to determine if the right virtual copy of the OS is already installed and enabled in the target device 100. The right target virtual copy of the OS would include not only the operating system itself, but possibly a particular version of it (or a range of permissible versions). Using the example described earlier, the target device—an iPhone running iOS—wants to run a Motorola Droid version of solitaire. However, this particular version of solitaire requires Android OS version 2.2 or later. In this case, the target device 100, the iPhone, looks to see if it has Android OS version 2.2. or later installed and enabled.

If not, the target device 100 sends a request S106 to the source device 10 to see if it has the needed OS (in this case, Android OS version 2.2 or later that can run on iOS). The source device 10 responds back S108 a response to the request S106 indicating whether it has the OS available or not.

If it does not, then the target device can send S110 a network request to the cloud or other network storage area/server 300 to determine if the correct OS version is available. The cloud or network storage area/server 300 responds back S112 to the request S110 indicating whether it has the OS available or not. The response back may be to reject S114 the target device's 100 request. In that case, since the target device 100 is unable to obtain the needed OS either from the source device 100 or the cloud network storage area/server 300, it is unable to run the requested application and the process terminates. A failure message may be communicated to the user (of the source and/or target device) if this occurs.

However, if the OS is available in either the source device 10 or the cloud/server 300, the following sequence takes place. The target device 100 dynamically creates a workspace (container) 160 to allocate resources (core partition, memory partition, network virtualization, etc.) S120. The target device 100 downloads the correct OS (either from the source device 10 or the cloud/server 300) and installs it as a virtual machine.

Next, the target device 100 downloads the desired application from the source device 10 and runs it S126 in the virtual machine environment incorporating the downloaded OS. The application can then be run and the user can interact with it via the display and other user interface elements of the target device S128.

In one variation, instead of (or in addition to) checking the cloud/server 300 for the correct OS version, other devices within the vicinity (or even across a WAN) could be checked as well. In other words, the correct version of the OS and the application could be downloaded from two different devices. In yet a further embodiment, the source device 10 could also refer the target device 100 to the cloud/server 300 for the requested OS and/or application.

By way of example, a target device 100 is an Android device. As illustrated in FIG. 6A, the target device's 100 smart VMM (the platform control manager 170) has the capability to run its own OS (Android) (although, as noted earlier, it could run its own OS outside of the context of the VMM), iOS, and BlackBerry OS, but not Windows Mobile. Thus, the target device 100 should only request an application and OS that it has the capability to run. For example, the platform control manager 170 might request a BlackBerry application and the BlackBerry OS from a BlackBerry source device 10, since it has the capability to run the BlackBerry OS. However, if the target device platform control manager 170 does not have the ability to run Windows Mobile, then a request by a user of the target device 100 to run a Windows Mobile application should result in informing the user of its lack of capability to do so. FIG. 6A shows the Android device that has the capability to run iOS, Android, and BlackBerry OS with only the BlackBerry OS having been downloaded.

FIG. 6B shows a simplified table of applications that may be run on various platforms. By way of a fictitious example only, a chat application is shown as being available for the BlackBerry OS, Windows Mobile, and the Palm OS, but not for iOS and Android.

FIG. 6C shows a simplified table of platforms that can be run on various platform control managers. By way of fictitious example, the Android PCM 170 can support the BlackBerry OS, iOS, and its own Android OS, but not Windows Mobile or Palm OS.

The tables shown in FIGS. 6B and 6C may be kept in the cloud/server 300, but can also be made available to the devices 10, 100 as well. Unlike the individual devices themselves, the tables in the cloud/server 300 should maintain all known compatibilities and relationships.

In addition to simply showing relationships between the applications, operating systems, and platform control managers, these tables could also incorporate version numbers for each of these variables. For example, the table might contain entries for Android 2.1, Android 2.2, and Android 3.0. The solitaire application might be compatible with versions 2.2 and 3.0 of Android, but not version 2.1.

Embodiments of the application can be implemented using a Type 1 or Type 2 hypervisor. In the Type 1 implementation, the downloaded OS has no different stature in the device than any other OS, whereas in the Type 2 implementation, the downloaded OS operates in a manner that is managed by the device's native OS.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of various aspect of the present disclosure, reference has been made to exemplary embodiments illustrated in the drawings, and specific language has been used to describe these embodiments. However, no limitation of the scope of the appended claims is intended by this specific language, and the claims should be construed to encompass all embodiments that would normally occur to one of ordinary skill in the art.

The present disclosure may be described in terms of functional block components and various processing steps. Such functional blocks may be realized by any number of hardware and/or software components that perform the specified functions. For example, embodiments of the present disclosure may employ various integrated circuit components, e.g., memory elements, processing elements, logic elements, look-up tables, and the like, which may carry out a variety of functions under the control of one or more microprocessors or other control devices. Similarly, where the elements of various aspects of the present disclosure are implemented using software programming or software elements the aspects of the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, aspects of the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the appended claims in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the following claims should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the present disclosure and does not pose a limitation on the scope of the claims unless otherwise claimed. Numerous modifications and adaptations will be readily apparent to those skilled in this art without departing from the spirit and scope of the present disclosure and/or the appended claims.

TABLE OF REFERENCE CHARACTERS 10, 10' source device
20, 20' sharable application
30, 30' sharable provisioning profile (source)
40, 40' hardware
50, 50' source device OS platform
70 platform control manager (e.g., smart hypervisor)
100 target device
130 sharable provisioning profile (target)
140 hardware
150 native/existing OS platform (target)
160, 160' container/reserved resource
170 platform control manager (e.g., smart hypervisor)
200 wired or wireless connection
300 platform repository

What is claimed is:

1. A method for downloading and running a non-native application designed for a source operating system (OS) on a target device having a target OS, the method implemented by a hypervisor running on the target device and comprising:
    connecting the target device to a first source device having the non-native application in a pairing operation;
    connecting the target device to a second source device having the source OS in a pairing operation;
    controlling transferring of a provisional profile from the first source device to the target device, the provisional profile containing characteristics related to the non-native application, including information on the source OS needed to run the application, comprising a source OS version number or range;
    obtaining the source OS on the target device, having a version that matches the version number or is within the range, from the second source using the provisional profile;
    once the source OS is present on the target device:
        executing the source OS as a virtual machine in the target OS on the target device;
        after executing the source OS as a virtual machine, downloading the non-native application from the first source device; and
        running the non-native application within the source OS virtual machine.

2. The method of claim 1, wherein the provisional profile further includes application data and hardware resources.

3. The method of claim 1, further comprising performing, in sequence:
    checking whether the source OS has been preloaded on the target device;
    if not, then checking whether the source OS is available on the second source device;
        if the source OS is available on the second source device, then perform the connecting the target device to the second source device having the source OS in the pairing operation;
        if the source OS is not available on the second source device, then checking whether the source OS is available in a network storage area;
        if the source OS is available in the network storage area, then downloading the source OS from a network storage area over a network.

4. The method of claim 1, further comprising indicating a failure to download the application if the source OS is not obtained successfully.

5. The method of claim 1, wherein a plurality of versions of the source OS are stored on the second source device, each directed to a different target device platform.

6. The method of claim 1, further comprising:
    performing a discovery process prior to the pairing with the first source device to determine if the first source device has the non-native application specified in the discovery process.

7. An electronic device for downloading and running a non-native application designed for a source operating system (OS), the electronic device comprising:
    a processor;
    a target OS; and
    a hypervisor executed on the processor, configured to:

connect to a first source device having the non-native application in a pairing operation;
connect to a second source device having the source OS in a pairing operation;
control transferring from the first source device to the electronic device a provisional profile containing characteristics related to the non-native application, including information on the source OS needed to run the application, comprising a source OS version number or range;
obtain the source OS, having a version that matches the version number or is within the range, from the second source using the provisional profile;
once the source OS is present on the electronic device:
    execute the source OS as a virtual machine in the target OS;
    after executing the source OS as a virtual machine, downloading the non-native application from the first source device; and
    run the non-native application within the source OS virtual machine.

8. A non-transitory computer readable medium comprising a computer readable program code embodied therein, said computer readable program code configured to implement a method for downloading and running a non-native application designed for a source operating system (OS) on a target device having a target OS, when the program code is executed by the computer, the method comprising:
    connecting the target device to a first source device having the non-native application in a pairing operation;
    connecting the target device to a second source device having the source OS in a pairing operation;
    controlling transferring of a provisional profile from the first source device to the target device, the provisional profile containing characteristics related to the non-native application, including information on the source OS needed to run the application, comprising a source OS version number or range;
    obtaining the source OS, having a version that matches the version number or is within the range, on the target device from the second source using the provisional profile;
    once the source OS is present on the target device:
        executing the source OS as a virtual machine in the target OS on the target device;
        after executing the source OS as a virtual machine, downloading the non-native application from the first source device; and
        running the non-native application within the source OS virtual machine.

* * * * *